United States Patent [19]
Grocki et al.

[11] 4,275,338
[45] Jun. 23, 1981

[54] ANTI-SPOT BURN PROTECTION FOR CRT

[75] Inventors: Wayne Grocki, Libertyville; Richard J. Steinmetz, Elk Grove Village, both of Ill.

[73] Assignee: Zenith Radio Corporation, Glenview, Ill.

[21] Appl. No.: 76,885

[22] Filed: Sep. 19, 1979

[51] Int. Cl.³ .............................................. H01J 29/52
[52] U.S. Cl. .................................................. 315/381
[58] Field of Search ................. 315/380, 381; 358/220

[56] References Cited
U.S. PATENT DOCUMENTS 3,448,328  6/1969  Horio et al. ........................ 315/380
3,946,275  3/1976  Marino ............................... 315/381

Primary Examiner—Theodore M. Blum
Attorney, Agent, or Firm—Thomas E. Hill

[57] ABSTRACT

A video amplifier circuit for a cathode ray tube in a video display includes an anti-spot burn protection system for preventing damage to the fluorescent screen when deflection voltages are removed as in tube turn-off. A diode network in the video amplifier circuit controls the rate of voltage decay on the CRT's cathode and brightness control grid following the removal of power, maintaining a pre-determined brightness control grid-cathode voltage differential thereby precluding tube turn-on.

6 Claims, 1 Drawing Figure

ANTI-SPOT BURN PROTECTION FOR CRT

CROSS REFERENCE TO RELATED APPLICATIONS

This application is related to, but in no way dependent upon the following application which is assigned to the assignee of the present application: Ser. No. 77,432 filed Sept. 20, 1979, entitled "Vertical Drive Circuit for Video Display", in the names of Lloyd Matthews and Gregory J. Beaumont.

BACKGROUND OF THE INVENTION

This invention relates in general to video displays and in particular to anti-spot burn protection circuitry for a CRT in a video display.

In a video display or other system utilizing a cathode ray tube (CRT) upon which are applied high voltages, adequate protection should be provided to protect the CRT's screen from a continuous beam of undeflected, energetic electrons impinging on the same spot when deflection voltages are removed. These deflection voltages may be removed either upon video display turn-off or upon failure of a low voltage power supply. In either case, permanent damage to the fluorescent coating of the CRT's screen may result. Collapse of the horizontal and vertical sweeps when the video display is either turned-off or deflection power is lost causes the electron beam to be concentrated at the free-fall center of the CRT, or the point where the beam impinges on the screen when undeflected by magnetic fields.

In general, a video display utilizing a CRT includes a low voltage power supply for driving the scanning and receiver circuitry and a high voltage power supply for energizing the accelerating grids of the CRT. The CRT's electron beam current is controlled by the relative potentials on the cathode and control grid electrodes with the cathode being coupled directly to the video input signal. The various electrode grids in the CRT perform functions as brightness control, picture focusing and contrast and background selection. When the video display is turned-off, it is possible, if the potential difference between the cathode and the brightness control grid does not exceed a given voltage value characteristic of the CRT, for electrons from the cathode to continue to be accelerated toward the phosphor-coated faceplate of the CRT long after the scanning voltages have decayed to zero. This undeflected positioning of the electron beam upon the CRT's faceplate produces a stationery bright spot. Since the undeflected electron beam will always impinge on the viewing screen at the free-fall center of the CRT, extended use of the video display results in a burned and permanently damaged spot at the point where the electron beam strikes the viewing screen when undeflected by magnetic fields.

In general, two approaches have been used in attempting to avoid the problem of spot-burn on the CRT of a video display. On approach involves the use of large B+ filter capacitors in maintaining a residual charge to permit the continued operation of the horizontal and vertical deflection circuits following video display turn-off. In this approach the intensity of the electron beam is not manipulated, but rather the residual energy of the electron beam is spread over a large portion of, if not the entire, viewing screen. This technique significantly increases the cost and complexity of the horizontal and vertical drive circuits. The other approach to eliminating this problem involves turning the CRT off by varying the potential difference between the brightness control grid and the cathode. Various attempts to solve the problem of spot-burn utilizing this approach are detailed in the prior art.

One such approach for preventing spot-burn by varying the voltage on a control grid is detailed in U.S. Pat. No. 3,629,645. This approach involves coupling the horizontal blanking pulses to a switching network comprised of a diode and a capacitor in parallel. The switching network is connected between the brightness control and ground, such that when a cessation of negative blanking pulses occurs the capacitor becomes positively charged with the diode becoming reverse biased and non-conducting. This results in the brightness control becoming disconnected from ground with the bias voltages on the control grids permitted to increase in the positive direction and thereby increase the beam current flowing through the picture tube. This causes an increase in beam current and the resulting discharge of stored accelerating energy to occur before the horizontal and vertical scans have collapsed, thereby preventing a stationery bright spot from forming on the viewing screen. While this approach adequately dissipates electron beam energy prior to scan cycle termination it represents an overly complicated solution to this problem. Not only must the flyback transformer be tapped as a source of input pulses to the switching network of this invention, but a neon bulb, or a second properly biased diode, must be incorporated between this switching network and the low voltage power supply to effect reversal of the operating state of the diode in this switching circuit. In addition, a potentiometer, various resistors and a capacitor are necessary for this invention to operate properly in a television receiver.

Another approach to solving the problem of spot-burn is disclosed in U.S. Pat. No. 3,784,870. The invention described therein involves the use of a three-input logic circuit with the three inputs being: a first direct current voltage indicating the presence or absence of horizontal deflection signals, a second direct current voltage indicating the presence or absence of vertical deflection signals, and mixed horizontal and vertical blanking signals for the electron beam. Should a failure occur in either the horizontal or vertical deflection circuits, the resulting change in direct voltage level input causes the logic circuit to become disabled resulting in a bias change on the control grids of the image presentation device so as to blank off the electron beam until corrective repairs are made. The system makes use of a single integrated circuit device for receiving, processing and decision-making functions. This system was designed primarily for use in communication systems employing a storage tube for either the selection of a frame of television information to be transmitted by means of an audio channel or in the recording and recreation of this television information when received by means of a communications link. While of particular value in such a specialized application, this invention would significantly increase video display unit costs particularly in a non-television application such as in a computer terminal or a data display.

Still another approach designed to avoid CRT faceplate spot-burn damage is disclosed in U.S. Pat. No. 3,510,722. This approach makes use of a discharge transistor whose collector to emitter path is in shunt with that of the video output stage. While biased off during normal operation, the discharge transistor is turned on when the television receiver is turned off. Current passing through the discharge transistor drives the cathode of the CRT towards ground thus increasing the forward bias on the electron guns of the CRT. As the cathode voltage becomes more negative, the voltages on the control grid electrodes do also, thus tending to maintain the potential difference between the control grids and the cathode relatively constant. When the control grid to cathode bias reaches a point where substantial beam current starts to flow a high voltage capacitor begins to discharge which loads the horizontal deflection generator. This, in turn, causes the discharge transistor to conduct more heavily causing a further increase in CRT current resulting in the fast discharge of the high voltage supply before the video screen supply is fully decayed and before the deflection raster has collapsed. The beam discharge energy is thus distributed over a relatively large area thereby minimizing the danger of localized damage to the screen. This approach therefore requires another transistor circuit in parallel with the video output stage for proper operation.

The present invention, however, makes use of a minimum number of additional components in combination with existing video output circuitry in providing reliable and safe protection against CRT screen spot-burn in a video display.

OBJECTS OF THE INVENTION

Accordingly, it is an object of the present invention to provide an improved high voltage decay system for CRT fluorescent screen protection.

It is another object of the present invention to provide an improved system for protecting the fluorescent screen of a CRT from spot-burn caused by undeflected, energetic electrons following tube turn-off.

BRIEF DESCRIPTION OF THE DRAWINGS

The appended claims set forth those novel features believed characteristic of the invention. However, the invention itself, as well as further objects and advantages thereof, will best be understood by reference to the following detailed description of a preferred embodiment taken in conjunction with the accompanying drawing, in which is shown a circuit diagram of an anti-spot burn protection system for a cathode ray tube in accordance with the preferred embodiment of the present invention.

DESCRIPTION OF THE PREFERRED EMBODIMENT

Figure 1:
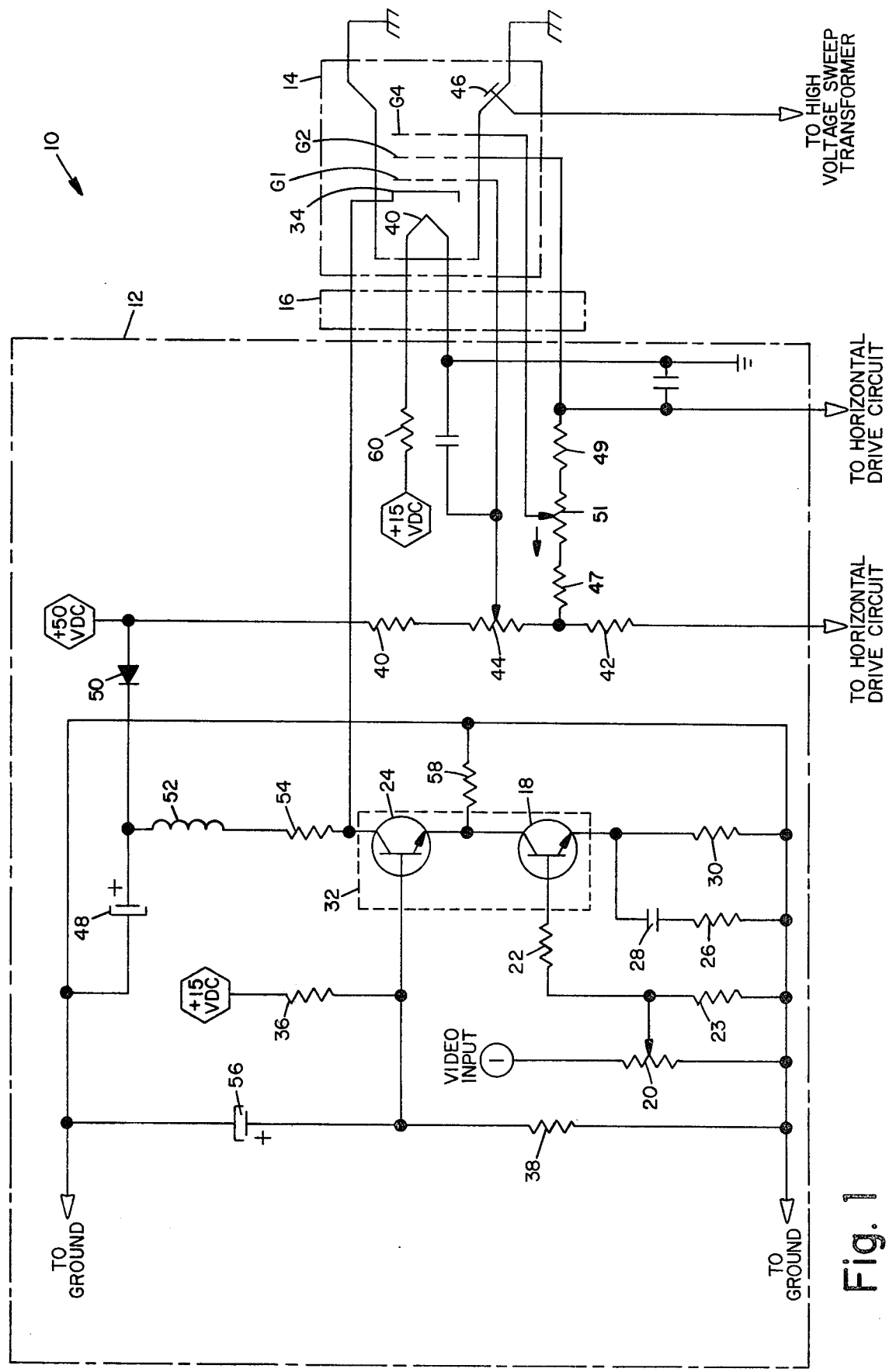

Referring to the circuit diagram of the FIGURE, there is shown an anti-spot burn protection system 10 for a video display in accordance with the preferred embodiment of the present invention. The primary components of this system are the video circuit 12 and the CRT 14. In the present embodiment, a CRT socket 16 is used to interface CRT 14 with the video circuit 12. In addition, as shown in the FIGURE, these components of the anti-spot burn protection system 10 interface with other systems of the video display.

A video input signal enters the system at pin 1 and is transmitted to the video driver transistor 18. In this input network, resistor 20 is a potentiometer providing a 500 ohm contrast control. Alternatively, the wiper arm shown in the FIGURE could contact pin 1 directly providing a contrast control outside of the video circuit 12. Resistor 22 acts as a base limiting resistor between input pin 1 and the base of the video driver 18. Resistor 23 is a 12 kilohm resistor to ground which in parallel with the input impedance of video driver 18 provides approximately a 6 kilohm input impedance to the video amplifier 32 which is comprised of video driver transistor 18 and video output transistor 24. Resistor 26 and capacitor 28 form a peaking network for the rising edge of the video input signal waveform. In peaking up high frequencies, video input signal losses in frequency response due to system capacities are compensated for thereby producing input signals possessing fast rise and fall times. Without this peaking effect and the resulting fast rise and fall times of the video input signals, the video circuit would have poor frequency response as evidenced by unwanted dots in the video presentation.

Resistor 30 is the emitter resistor of the video driver 18. The voltage across resistor 30 is determined by the video input signal voltage level at pin 1 of the edge connector with a 0.6 volt drop from pin 1 to the emitter of video driver 18. The emitter voltage of video driver 18 across resistor 30 determines the amount of current flowing thru the video amplifier 32. The video amplifier gain is determined by the ratio of the collector load 50 of the video output transistor 24 to the emitter load 30 of the video driver transistor 18. In the preferred embodiment of the present invention, resistor 54 is 820 ohms while resistor 30 is 47 ohms providing a video amplifier gain of 17. This gain is necessary because of the peak-to-peak voltage required at the collector of the video output transistor 24 to drive the cathode 34 of the CRT to a less positive voltage.

The voltage on cathode 34 is controlled by the video amplifier 32 as determined by the video input signal voltage level at pin 1. The combination of video driver transistor 18 and video output transistor 24 comprises a cascode-type video amplifier which operates in the following manner. With no video input signal at pin 1, the video driver 18 is off and the base of the video output 24 is biased through a set of one kilohm resistors, 36 and 38, by means of a +15 VDC supply which puts a 7.5 volt bias on the base of the video output 24. With the base of the video output 24 biased at a voltage level less than the B+ voltage, if the emitter of the video output is allowed to come down 0.6 volts below this base voltage, the video output 24 will turn on. The video driver transistor 18 thus acts as a switch with respect to the video output 24 such that if the video input signal on pin 1 is low, the video driver 18 will be off with no current flowing thru either transistor of the video amplifier 32. When a TTL—level input signal is applied to pin 1, the video driver 18 is turned on and starts to pull current through the video amplifier 32 because its base is biased higher than its emitter. The current passing through the video amplifier 32 is determined by the emitter voltage of the video driver 18 divided by emitter resistor 30 depending on the level of the dc video input pulse. This also determines the peak-to-peak voltage level at the collector of the video output transistor 24 which is the output signal provided to the CRT's cathode 34.

The cathode 34, heated by filaments 40 and energized by the output signal of the video amplifier 32, acts as the source of electrons in the CRT 14. The dc voltage level on grid G1 establishes the brightness level of the video presentation. The dc level applied to grid G1 is determined by resistors 40 and 42 and potentiometer 44. Contrast and background of the video presentation are established by the voltage applied to grid G2. This voltage level is a fixed quantity determined by the operating specifications of the particular CRT. The dc voltage is provided to grid G2 by the horizontal drive circuit. A variable dc voltage is applied to grid G4 for proper focusing of the electron beam on the CRT's screen. This voltage level is established by resistors 47 and 49 and potentiometer 51.

The operation of CRT 14 is controlled by the voltage differential between cathode 34 and grid G1. When this voltage differential becomes less than a predetermined value which is characteristic of the CRT, electrons are emitted by the cathode 34 and accelerated towards the CRT's screen. The video display's high voltage sweep transformer (not shown) provides a high positive voltage to the CRT's anode 46 for accelerating the electron beam to the screen.

With brightness resistor 44 at a given setting and a corresponding dc voltage applied to grid G1, the CRT is turned on by means of video input signals on pin 1. If no video input signal is provided to pin 1, the collector of the video output transistor 24 is at a dc voltage level of approximately 50 volts. A dc voltage level of between −80 volts and +20 volts is applied to grid G1 during CRT operation by means of variable brightness resistor 44. The voltage differential between cathode 34 and grid G1 varies between 40 and 60 volts during CRT operation so that if the collector of the video output transistor 24 is at approximately 50 volts with no video input signal applied to pin 1, grid G1 must be from 40 to 60 volts below the voltage level on cathode 34 in order for CRT 14 to be off. The larger the negative video input signal on pin 1, the lower the collector voltage of video output 24, the lower the dc voltage level on cathode 34 and the brighter the video presentation on the CRT 14.

The problem of spot-burn occurs when the video display is turned off or operating power is lost. This results in the termination of electron beam deflection by means of electromagnetic deflection coils and the illumination by the intense electron beam of a single spot on the CRT's screen. This can result in permanent damage to the phosphor-coated screen. The problem occurs primarily because of the relative rates of voltage decay of the cathode 34 and grid G1 or the brightness control. With grid G1 operating between −80 volts and +20 volts when the CRT is on, when power is removed from the video display grid G1 stabilizes at a voltage somewhere between these two operating limits, typically at ground or approximately −5 volts. The voltage level at which grid G1 stabilizes is a characteristic of the individual CRT. With the 50 volt dc supply from the horizontal drive circuit removed, the 50 volts dc applied to the cathode also begin to decay toward ground. This results in a decreasing voltage differential between cathode 34 and grid G1 which may effect the turning on of CRT 14. The present invention operates to control the voltage decay of the cathode and grid G1 thus maintaining the voltage differential between these two CRT elements at a constant level thereby precluding tube turn-on following the removal of power.

In accordance with the present invention, capacitor 48 and diode 50 permit the video amplifier 32 and, in turn, the cathode 34 to decay in voltage at a slower rate than that of grid G1 when power is removed from the video display. With no video signal input on pin 1, the video amplifier 32 does not conduct current. As a result, the collector of video output transistor 24 is only a diode's difference in voltage from the +50 volt dc supply. Capacitor 48 is kept in a highly charged state by means of the +50 volt dc supply thru diode 50. With no video input applied to pin 1, the charge on capacitor 48 and the voltage across the video amplifier 32 remains for an extended period of time measured in tens of seconds. The voltage decay time constant of the video circuit 12, therefore, is much greater than the decay constant of the +50 volt dc power supply resulting in the cathode 34 decaying in voltage at a slower rate than grid G1. This decay rate differential maintains the 50 volt differential between the cathode 34 and grid G1 required to keep the tube off following the removal of power.

Capacitor 48 thus holds charge for supplying the video amplifier 32. As the +50 volt dc supply decays, the video output transistor 24 draws current from capacitor 48 which is discharging. The voltage at capacitor 48, however, cannot go any lower than one diode drop below the voltage of the decaying dc voltage supply because of the presence of diode 50 in the capacitor charging circuit. Capacitor 48 and the +50 volt dc power supply follow each other as they simultaneously decay. With capacitor 48 being charged by means of the +50 volt dc power supply and being discharged by current flow only through the video circuit 12, video amplifier 32 decays at a slower rate than the +50 volt dc power supply. Diode 50 thus not only slows the voltage decay of video amplifier 32 and cathode 34, but also, and simultaneously, increases the voltage decay of the +50 volts dc supply. This is accomplished by loading that supply with not only the CRT, and vertical and horizontal drive circuits, but also the video circuit.

Resistors 36 and 38 form a divider network for the dc voltage applied to the base of the video output transistor 24. With its base thus biased, the video input transistor 24 turns on when the video driver transistor 18 begins to conduct. Choke, or coil, 52 acts to peak the video response in order to compensate for losses due to CRT and conductor capacitances in the system. With coil 52 providing essentially no voltage drop across it, resistor 54 provides a collector load resistance for the video amplifier 32. Resistor 54 provides the necessary voltage drop from the 50 volts dc supply to permit the video circuit 12 to generate the necessary peak-to-peak voltages to operate a variety of CRT's possessing various tube intensities. Capacitor 56 provides for dc filtering at the base of the video output transistor 24. Resistor 58 acts as a bleeder resistor for reverse current flowing out of the cathode 34 thru the video output transistor 24 when the video driver transistor 18 is off. By bleeding this reverse current to ground, the possibility of charging capacitor 48 above 50 volts dc by the passage of current through resistor 54 and coil 52 is avoided.

The +50 volt dc supply has a small filter capacitor (not shown) attached to it which acts as an initial filter for the 50 volt dc line. However, the small size of this capacitor results in input signal ripple when the video amplifier 32 turns on. In order to smooth out this dc signal and thus provide a level CRT intensity for various input signal levels, filter capacitor 48 is incorporated. During video display operation and input voltage decay following turnoff, capacitor 48 is maintained at a voltage one diode drop below that of the +50 volt dc power supply by diode 50. Diode 50, therefore, not only maintains capacitor 48 in essentially a fully charged state but also limits capacitor discharge to the discharge path defined by coil 52, resistor 54 and cathode 34 with its resistor 60. While capacitor 48 has only one path for discharge, the +50 volt dc power supply continues to energize the CRT 14, the horizontal and vertical drive circuits, and the video circuit 12. This results in the more rapid decay of the +50 volt dc power supply voltage applied to grid G1 with the voltage on cathode 34 thus maitaining the 50 volt differential between these two CRT elements required for tube turnoff.

The +15 volt dc source together with resistors 36 and 38 provides the proper biasing of the base of the video output transistor 24 for operation when a video input signal initiates current conduction by video driver 18. The 15 volt dc supply is loaded by the video circuit 12, the horizontal drive circuit (not shown) and the vertical drive circuit (not shown). The +15 volts dc supply, therefore, generally decays much more rapidly than the +50 volt dc supply due to this excessive loading. If the +15 volt dc supply decays very quickly, the video output transistor 24 is turned off with the charge on capacitor 48 remaining at whatever state it was prior to the rapid fall-off of the +15 volt dc supply. With this large residual charge on capacitor 48, the rate of decay of the cathode 34 is slowed with the required 50 volt differential between cathode 34 and grid G1 maintained. However, if the 15 volt dc supply decays slowly, it is possible that the cathode voltage could come very close to the G1 voltage. With a slowly decaying bias voltage applied to the base of the video output transistor 24, an increased discharge rate of capacitor 48 would result causing an the cathode voltage to decrease at a faster rate. This would result in tube turn-on following the removal of power from the video display. Thus, for the present invention to operate properly the low voltage +15 volt dc supply must decay at a more rapid rate than the high voltage +50 volt dc supply.

By way of illustrative example and not by way of limitation, the following components of the preferred embodiment of the present invention may have the following values.

| REF # | PREFERRED VALUE |
|---|---|
| 20 | 500 ohms |
| 22 | 47 ohms |
| 26 | 22 ohms |
| 28 | 100 picofarads |
| 30 | 47 ohms |
| 36 | 1 kilohm |
| 38 | 1 kilohm |
| 40 | 27 kilohms |
| 42 | 3.3 kilohms |
| 44 | 100 kilohms |
| 48 | 47 microfarad |
| 52 | 6.8 microhenries |
| 54 | 820 ohms |
| 56 | 47 microfarrads |
| 58 | 15 kilohms |
| 60 | 16 kilohms |

There has thus been provided an anti-spot burn protection system for preventing damage to the fluorescent screen of a cathode ray tube in a video display when electron beam deflection voltages are removed as in tube turn-off. By controlling the rate of decay of voltage applied to the CRT's cathode relative to the rate of decay of voltage applied to its brightness control electrode grid, the requisite voltage differential is maintained for electron beam turn-off.

In addition, while particular embodiments of the invention have been shown and described, it will be obvious to those skilled in the art that changes and modifications may be made without departing from the invention in its broader aspects and, therefore, the aim in the appended claims is to cover all such changes and modifications as fall within the true spirit and scope of the invention.

We claim:

1. In a video display apparatus including a cathode ray tube having a plurality of electron beam control grid electrodes including a cathode and a brightness control grid electrode, video signal amplification means for coupling a video input signal to said cathode, a high voltage power supply for energizing said video signal amplification means and said brightness control grid electrode, a protection system comprising:

a low voltage source coupled to said video signal amplification means for proper biasing of said video signal amplification means, said low voltage source having a higher rate of decay than said high voltage power supply following the removal of power from said video display apparatus;

unidirectional conducting means for coupling said high voltage power supply to said video signal amplification means; and capacitor means coupling said unidirectional conducting means to ground reference potential, said capacitor means being charged by said high voltage power supply by means of said unidirectional conducting means and coupled to said video signal amplification means for energizing said video signal amplification means upon discharge thereof, thereby maintaining a pre-determined decay voltage differential between said cathode and said brightness control grid electrode to prevent cathode ray tube turn-on following the removal of power from said video display apparatus.

2. A system in accordance with claim 1, wherein said unidirectional conducting means comprises a diode having a first electrode connected to said high voltage power supply and a second electrode connected to said video signal amplification means and said capacitor means.

3. A system in accordance with claim 1, wherein the charge-discharge time constant of said switching means and said capacitor means combination is greater than the rate at which said high voltage power supply decays following the removal of power from said video display apparatus.

4. A video display apparatus including a cathode ray tube having a plurality of electron beam control grid electrodes including a cathode and a brightness control grid electrode, electron beam deflection means coupled to said cathode ray tube, circuit means for generating vertical and horizontal deflection signals for driving said beam deflection means to cause a raster to be scanned on the screen of said cathode ray tube, video signal amplification means for directly coupling a video input signal to said cathode including means for receiving a video input signal and video signal output means, a high voltage power supply for energizing the video signal amplification means and the brightness control grid electrode, a protection system comprising:

a low voltage source coupled to said video signal output means for proper biasing of said video signal output means, said low voltage source having a higher rate of decay than said high voltage power supply following the removal of power from said video display apparatus;

diode conducting means having a first electrode connected to said high voltage power supply and a second electrode connected to said video signal amplification means; and capacitor means coupling the second electrode of said diode conducting means to ground reference potential, said capacitor means being charged by said high voltage power supply by means of said diode conducting means and coupled to said video signal amplification means for energizing said video signal amplification means upon discharge thereof, thereby maintaining a predetermined decay voltage differential between said cathode and said brightness control grid electrode to prevent cathode ray tube turn-on following the removal of power from said video display apparatus.

5. A system in accordance with claim 4, wherein said video signal amplification means includes a video output transistor and a video driver transistor with the second electrode of said diode conducting means connected to the collector of said video output transistor and with the means for receiving a video input signal connected to the base and the emitter of said video output transistor connected to the collector of said video driver transistor.

6. A system in accordance with claim 4, wherein said electron beam deflection means are driven by said low voltage source to increase the rate of decay of said low voltage source following the removal of power from said video display apparatus.

* * * * *